United States Patent
Wang et al.

(10) Patent No.: US 12,524,837 B2
(45) Date of Patent: Jan. 13, 2026

(54) IMAGE RECONSTRUCTION METHOD AND APPARATUS, TERMINAL DEVICE, AND STORAGE MEDIUM

(71) Applicant: SHENZHEN INSTITUTES OF ADVANCED TECHNOLOGY CHINESE ACADEMY OF SCIENCES, Guangdong (CN)

(72) Inventors: Shanshan Wang, Guangdong (CN); Haoyun Liang, Guangdong (CN); Hairong Zheng, Guangdong (CN); Xin Liu, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 280 days.

(21) Appl. No.: 18/555,723

(22) PCT Filed: Apr. 19, 2021

(86) PCT No.: PCT/CN2021/088049
§ 371 (c)(1),
(2) Date: Oct. 16, 2023

(87) PCT Pub. No.: WO2022/221982
PCT Pub. Date: Oct. 27, 2022

(65) Prior Publication Data
US 2024/0202873 A1 Jun. 20, 2024

(51) Int. Cl.
*G06T 5/20* (2006.01)
*G06T 5/50* (2006.01)
*G06T 5/60* (2024.01)

(52) U.S. Cl.
CPC .............. *G06T 5/20* (2013.01); *G06T 5/50* (2013.01); *G06T 5/60* (2024.01); *G06T 2207/20084* (2013.01); *G06T 2207/20221* (2013.01)

(58) Field of Classification Search
CPC .... G06T 5/20; G06T 5/60; G06T 5/50; G06T 2207/20084; G06T 2207/20221
See application file for complete search history.

(56) References Cited

U.S. PATENT DOCUMENTS

2021/0319560 A1* 10/2021 Xia ..................... G06T 3/4046
2022/0351333 A1* 11/2022 Navarrete Michelini ................... G06T 3/4046

FOREIGN PATENT DOCUMENTS

| CN | 109685968 A | 4/2019 |
|---|---|---|
| CN | 110728627 A | 1/2020 |

OTHER PUBLICATIONS

NPL: Results Publication Date Range: Mar. 11, 2020 to Aug. 12, 2025.*

(Continued)

*Primary Examiner* — Quang N Vo
(74) *Attorney, Agent, or Firm* — Maschoff Brennan

(57) ABSTRACT

The present application relates to image processing technical field, and provides a method for image reconstruction, an apparatus, a terminal device, and a storage medium. The method first extracts an initial feature map of an original image, then calculates an average value of each column pixel in the initial feature map, and constructs a target row vector and duplicates the target row vector in the column direction after convolution processing, to obtain a feature map. In addition, an average value of the element of each row of pixels in the initial feature map is calculated respectively, and a target column vector is constructed. It is duplicated in a row direction to obtain another feature map, (Continued)

and then the two feature maps are fused. Finally, two-dimensional convolution processing is performed on a fused feature map, and a reconstructed image is generated, thereby the long-distance dependencies of the image can be captured.

9 Claims, 6 Drawing Sheets

(56) References Cited

OTHER PUBLICATIONS

IWIPO, "International Search Report and Written Opinion" issued in connection with PCT Patent Application PCT/CN2021/088049, dated Jan. 24, 2022, 14 pages (8 pages of English Translation and 6 pages of Official copy).

Qibin et al., "Strip Pooling: Rethinking Spatial Pooling for Scene Parsing", 2020 IEEE/CVF Conference on Computer Vision and Pattern Recognition (CVPR), Jun. 19, 2020, 10 pages.

\* cited by examiner

IMAGE RECONSTRUCTION METHOD AND APPARATUS, TERMINAL DEVICE, AND STORAGE MEDIUM

TECHNICAL FIELD

The present application relates to the technical field of image processing, particularly refers to a method, an apparatus, a terminal device and a storage medium for image reconstruction.

BACKGROUND

At present, deep learning has become a common technical means for image reconstruction. The image reconstruction methods based on deep learning in the art can be mainly divided into two categories. One is unfolding method, which starts from the problem of image optimization and then unfolds an optimization algorithm into a neural network. The architecture of the neural network is built based on iteration. The other is non-unfolding method, which directly learns the mapping from zero-filled data to full-sampled data to complete image reconstruction. However, neither of these two methods can capture the interdependence between different image regions with related content in the feature image, that is, the long-distance dependencies of the image cannot be captured.

SUMMARY

In light of this, the embodiments of the present application provide a method, an apparatus, a terminal device and a storage medium for image reconstruction, which can capture the long-distance dependencies of images.

The first aspect of the embodiments of the present application provides a method for image reconstruction, comprising:
  acquiring a to-be-reconstructed original image;
  extracting an initial feature map of the original image;
  respectively calculating an average value of element values for each column of pixels in the initial feature map, and constructing a target row vector in accordance with a calculated average value corresponding to each column of pixels;
  respectively calculating an average value of element values for each row of pixels in the initial feature map, and constructing a target column vector in accordance with a calculated average value corresponding to each row of pixels;
  performing one-dimensional convolution processing on the target row vector, and duplicating the target row vector after the one-dimensional convolution processing in direction of column, to obtain a first feature map;
  performing one-dimensional convolution processing on the target column vector, and duplicating the target column vector after the one-dimensional convolution processing in direction of row, to obtain a second feature map;
  fusing the first feature map and the second feature map to obtain a third feature map;
  performing two-dimensional convolution processing on the third feature map to obtain a fourth feature map;
  generating a reconstructed image corresponding to the initial image in accordance with the fourth feature map.

In an embodiment of the present application, firstly, extracting an initial feature map of an original image, then respectively calculating an average value of element values for each column of pixels in the initial feature map, and constructing a target row vector in accordance with the average value, and duplicating the target row vector after a one-dimensional convolution processing in direction of column, to obtain a feature map; and, respectively calculating an average value of element values for each row of pixels in the initial feature map, and constructing a target column vector in accordance with the average value, and duplicating the target column vector after a one-dimensional convolution processing in direction of row, to obtain another feature map; then fusing the two feature maps. Finally, a reconstructed image is generated based on the fused feature map after a two-dimensional convolution processing is performed on the fused feature map. The above procedures use an approach of cross-pooling, which is equivalent to deploying a long bar-shaped (a row or column of the feature map) pooling kernel along one spatial dimension, this allows a wider range of pixels to be used in feature calculation, and therefore, it can capture the long-distance dependencies in images.

In an embodiment of the present application, the step of generating a reconstructed image corresponding to the initial image in accordance with the fourth feature map may comprises:
  performing a convolution processing with a preset number of convolution kernels on the fourth feature map to obtain a plurality of target feature maps;
  dividing the plurality of target feature maps into more than two target feature map combinations, wherein, each of the target feature map combinations includes more than two target feature maps;
  for each target feature map combination, respectively performing two-dimensional convolution processing on each target feature map in the target feature map combination, and then generating a mapping feature map combination corresponding to the target feature map combination by using feature mapping, wherein, the mapping feature map combination includes mapping feature maps obtained after being processed by a preset mapping function for each target feature map in the target feature map combination;
  generating a reconstructed image corresponding to the initial image in accordance with each target feature map combination and each mapping feature map combination.

By using the way of feature mapping, more feature maps can be obtained under the premise of lower amount of calculation to improve the performance of the deep neural network used in image reconstruction.

Furthermore, the step of generating a reconstructed image corresponding to the initial image in accordance with each target feature map combination and each mapping feature map may comprise:
  arranging each target feature map combination and each mapped feature map combination in a specified order to obtain a final feature map combination;
  generating a reconstructed image corresponding to the initial image in accordance with the final feature map combination.

By sorting, a final feature map combination containing a large number of feature maps can be obtained, and then the reconstructed image corresponding to the original image can be generated based on the final feature map combination.

Furthermore, the step of arranging each target feature map combination and each mapped feature map combination in a specified order to obtain a final feature map combination may comprise:

arranging each target feature map combination at two ends of the final feature map combination, and arranging each mapped feature map combination between the two ends of the final feature map combination.

When arranging the feature map combination, each target feature map combination can be arranged at two ends, and each mapping feature map combination can be arranged in the middle.

Furthermore, the step of generating a reconstructed image corresponding to the initial image in accordance with the final feature map combination may comprise:

performing a deconvolution processing on feature maps in the final feature map combination, and then fusing the feature maps after the deconvolution processing to obtain a reconstructed image corresponding to the initial image.

When generating the reconstructed image, the feature map in the final feature map combination can be input into the deconvolution layer for processing, and the dimension of the feature map can be upgraded to make the dimensionality of the processed result consistent with that of the reconstructed image, meanwhile, all feature maps can be fused by setting the number of input channels to the number of channels of the reconstructed image, so as to obtain the final reconstructed image.

Furthermore, the step of generating a mapping feature map combination corresponding to the target feature map combination by using feature mapping may comprise:

using a preset linear function as the mapping function, and performing the feature mapping on each target feature map in the target feature map combination to obtain the mapping feature maps respectively corresponding to each target feature map in the target feature map combination.

By using the linear function as the mapping function, the amount of calculation in feature mapping process may be further reduced.

In an embodiment of the present application, the step of fusing the first feature map and the second feature map to obtain a third feature map may comprise:

summing elements at corresponding positions of the first feature map and the second feature map to obtain the third feature map.

For reducing the amount of calculation, the method of summing elements at corresponding position can be adopted when fusing the two feature maps.

The second aspect of the embodiments of the present application provides an apparatus for image reconstruction, comprising:

an original image acquiring module, configured to acquire a to-be-reconstructed original image;

a feature extracting module, configured to extract an initial feature map of the original image;

a row vector constructing module, configured to respectively calculate an average value of element values for each column of pixels in the initial feature map, and construct a target row vector in accordance with a calculated average value corresponding to each column of pixels;

a column vector constructing module, configured to respectively calculate an average value of element values for each row of pixels in the initial feature map, and construct a target column vector in accordance with a calculated average value corresponding to each row of pixels;

a row vector duplicating module, configured to perform one-dimensional convolution processing on the target row vector, and duplicate the target row vector after the one-dimensional convolution processing in direction of column to obtain a first feature map;

a column vector duplicating module, configured to perform one-dimensional convolution processing on the target column vector, and duplicate the target column vector after the one-dimensional convolution processing in direction of row to obtain a second feature map;

a feature fusing module, configured to fuse the first feature map and the second feature map to obtain a third feature map;

a two-dimensional convolution module, configured to perform two-dimensional convolution processing on the third feature map to obtain a fourth feature map;

an image reconstruction module, configured to generate a reconstructed image corresponding to the initial image in accordance with the fourth feature map.

The third aspect of the embodiments of the present application provides a terminal device, comprising a memory, a processor, and a computer program stored on the memory and configured to be executed by the processor, the computer program, when executed by the processor, implements the method for image reconstruction provided by the first aspect of the embodiments of the present application.

The fourth aspect of the embodiments of the present application provides a non-transitory computer readable storage medium, configured to store a computer program, the computer program, when executed by a processor, implements the method for image reconstruction provided by the first aspect of the embodiments of the present application.

The fifth aspect of the embodiments of the present application provides a computer program product, when operated on a terminal device, executes the method for image reconstruction provided by the first aspect of the embodiments of the present application.

It can be understood that the beneficial technical effects of the second aspect to fifth aspect can be referred to the relevant descriptions in the first aspect, and therefore are not further elaborated here.

DETAILS OF DESCRIPTION

In the following description, specific details such as specific system architecture, technology, etc., are presented for the purpose of illustration rather than limitation in order to fully understand the embodiments of the present application. However, it should be clear to those skilled in the art that the present application may also be realized in other embodiments without these specific details. In other cases, detailed descriptions of well-known systems, devices, circuits and methods are omitted so as not to prejudice the description of this application with unnecessary details. In addition, the terms "first", "second", "third", etc. in the description of the present application and the accompanying claims are used only to distinguish descriptions and are not to be construed as indicating or implying relative importance.

The present application provides a method, an apparatus, a terminal device and a storage medium for image reconstruction, which may solve the problem that when reconstructing an image, the long-distance dependencies of images cannot be captured. It should be understood that the execution subjects of the various embodiments of the methods of the present application are various types of terminal devices or servers, such as mobile phones, tablets, laptops, desktop computers and wearable devices.

Figure 1:
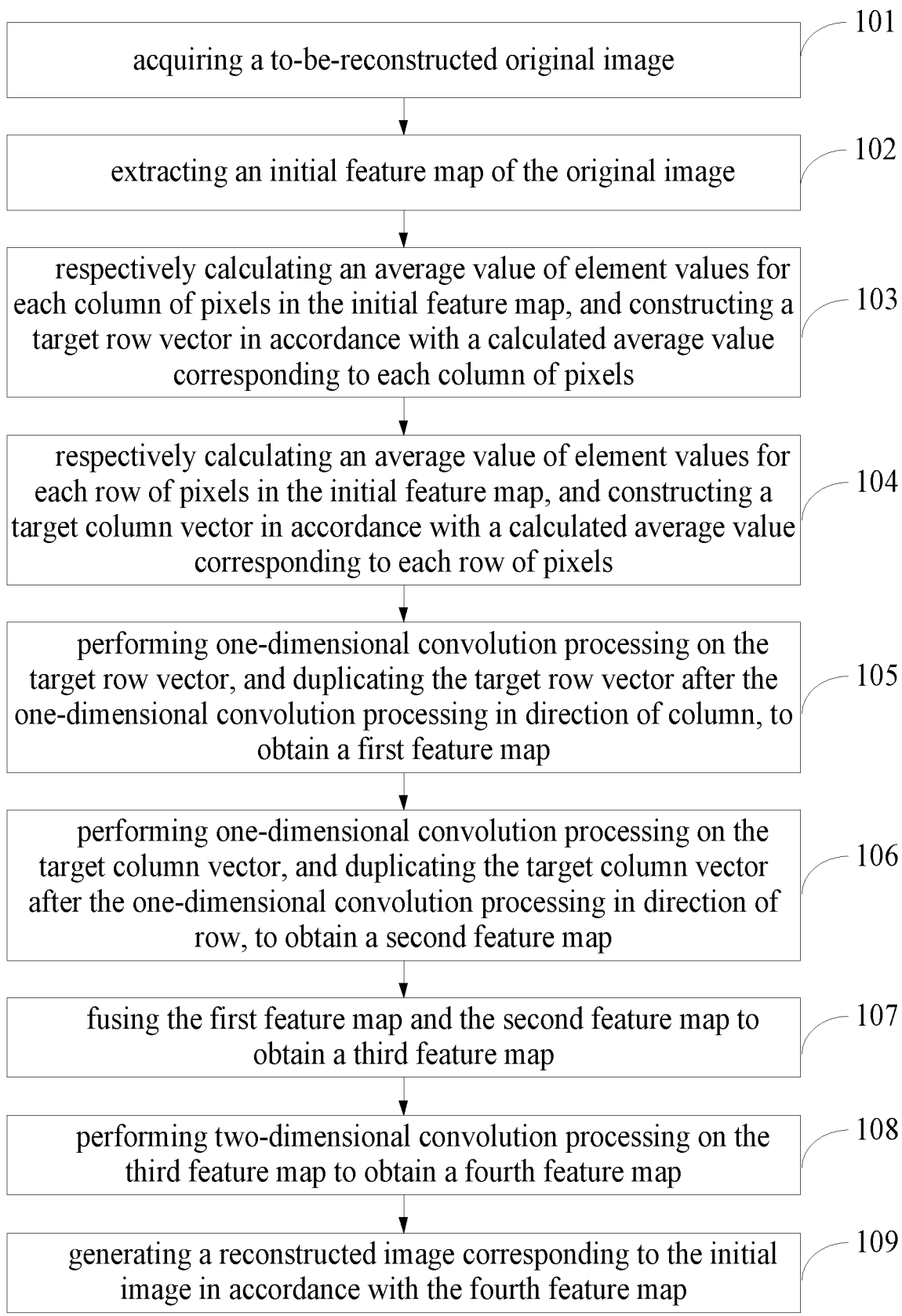
FIG. 1 is a flow chart of an embodiment of the method for image reconstruction provided by embodiments of the present application.

Please refer to FIG. 1, which illustrates a method for image reconstruction provided by the embodiments of the present application, comprising:

step 101, acquiring a to-be-reconstructed original image;

firstly, acquiring a to-be-reconstructed original image. The original image can be a blurry image and a corresponding a clear image needs to be reconstructed.

Step 102, extracting an initial feature map of the original image;

after acquiring the original image, the feature map of the original image needs to be extracted. For example, various feature extraction networks in the prior art can be used to perform convolution and other processing on the original image to extract the corresponding feature image as the initial feature map in an embodiment of this application. It should be noted that, the present application does not place any restrictions on the structure and the type of feature extraction network.

Step 103, respectively calculating an average value of element values for each column of pixels in the initial feature map, and constructing a target row vector in accordance with a calculated average value corresponding to each column of pixels;

after extracting an initial feature map, respectively calculating an average value of element values for each column of pixels in the initial feature map, for example, for the first column of pixels in the initial feature map, the element values of all pixels in the column are added together and then the average value is calculated to obtain the average value corresponding to the first column of pixels. By analogy, the same operation is performed for each column of pixels in the initial feature map, so as to obtain average values respectively corresponding to each column of pixels. Then, a target row vector is constructed according to the obtained average values corresponding to each column of pixels. The number of elements of the target row vector is equal to the number of columns in the initial feature map, and the value of each element is the average value corresponding to that of the column, that is, the average values corresponding to each column of pixels are combined to form a row vector.

Step 104, respectively calculating an average value of element values for each row of pixels in the initial feature map, and constructing a target column vector in accordance with a calculated average value corresponding to each row of pixels;

similar to the method used to construct the target row vector, when constructing a target column vector, the average value of the element values of each row of pixels in the initial feature map is calculated respectively. For example, for the first row of pixels in the initial feature map, the element values of all pixels in this row are added together and then the average value is calculated to obtain the average value corresponding to the first row of pixels, and so on, the same operation is performed for each row of pixels of the initial feature map, so as to obtain average values corresponding to each row of pixels respectively. Then, a target column vector is constructed according to the obtained average values corresponding to each row of pixels. The number of elements of the target column vector is equal to the number of rows in the initial feature map, and the value of each element is the average value of the corresponding row's element values, that is, the average values corresponding to each row of pixels are combined to form a column vector.

Step 105, performing one-dimensional convolution processing on the target row vector, and duplicating the target row vector after the one-dimensional convolution processing in direction of column, to obtain a first feature map;

for the obtained target row vector, one-dimensional convolution processing is performed thereon first, for example, a one-dimensional (1D) convolution with a convolution kernel at size 3 can be used, and then the target row vector after one-dimensional convolution processing is duplicated in the column direction to obtain the first feature map. Generally, the size (number of rows and columns) of the first feature map obtained by duplicating the target row vector can be the same as the size of the initial feature map.

Step 106, performing one-dimensional convolution processing on the target column vector, and duplicating the target column vector after the one-dimensional convolution processing in direction of row, to obtain a second feature map;

similarly, for the obtained target column vector, likewise, a one-dimensional convolution processing is performed thereon first, for example, a one-dimensional (1D) convolution with a convolution kernel at size of 3 can be used, and then the target column vector after one-dimensional convolution processing is duplicated in the row direction to obtain the second feature map. Generally, the size (number of rows and columns) of the second feature map obtained by duplicating the target column vector can be the same as the size of the initial feature map.

Step 107, fusing the first feature map and the second feature map to obtain a third feature map;

then, fusing the first feature map and the second feature map, and the way of fusion can comprise superposing the corresponding position elements, taking the maximum value of the corresponding position elements, and taking the average value of the corresponding position elements, so as to obtain a third feature map with the same size.

In an embodiment of the present application, the step of fusing the first feature map and the second feature map to obtain a third feature map may comprise:

summing elements at corresponding positions of the first feature map and the second feature map to obtain the third feature map.

For reducing the amount of calculation, the method of summing elements at corresponding position can be adopted when fusing the two feature maps. For example, the elements of the first row and first column of the first feature map are summed with the elements of the first row and first column of the second feature map to obtain the elements of the first row and first column of the third feature map; the elements of the first row and second column of the first feature map are summed with the elements of the first row and second column of the second feature map to obtain the elements of the first row and second column of the third feature map, and so on.

Step 108, performing two-dimensional convolution processing on the third feature map to obtain a fourth feature map;

then, performing two-dimensional convolution processing, such as two-dimensional (2D) convolution with a convolution kernel at size of 3 can be used, on the third feature map obtained by fusing to obtain the fourth feature map.

Figure 2:
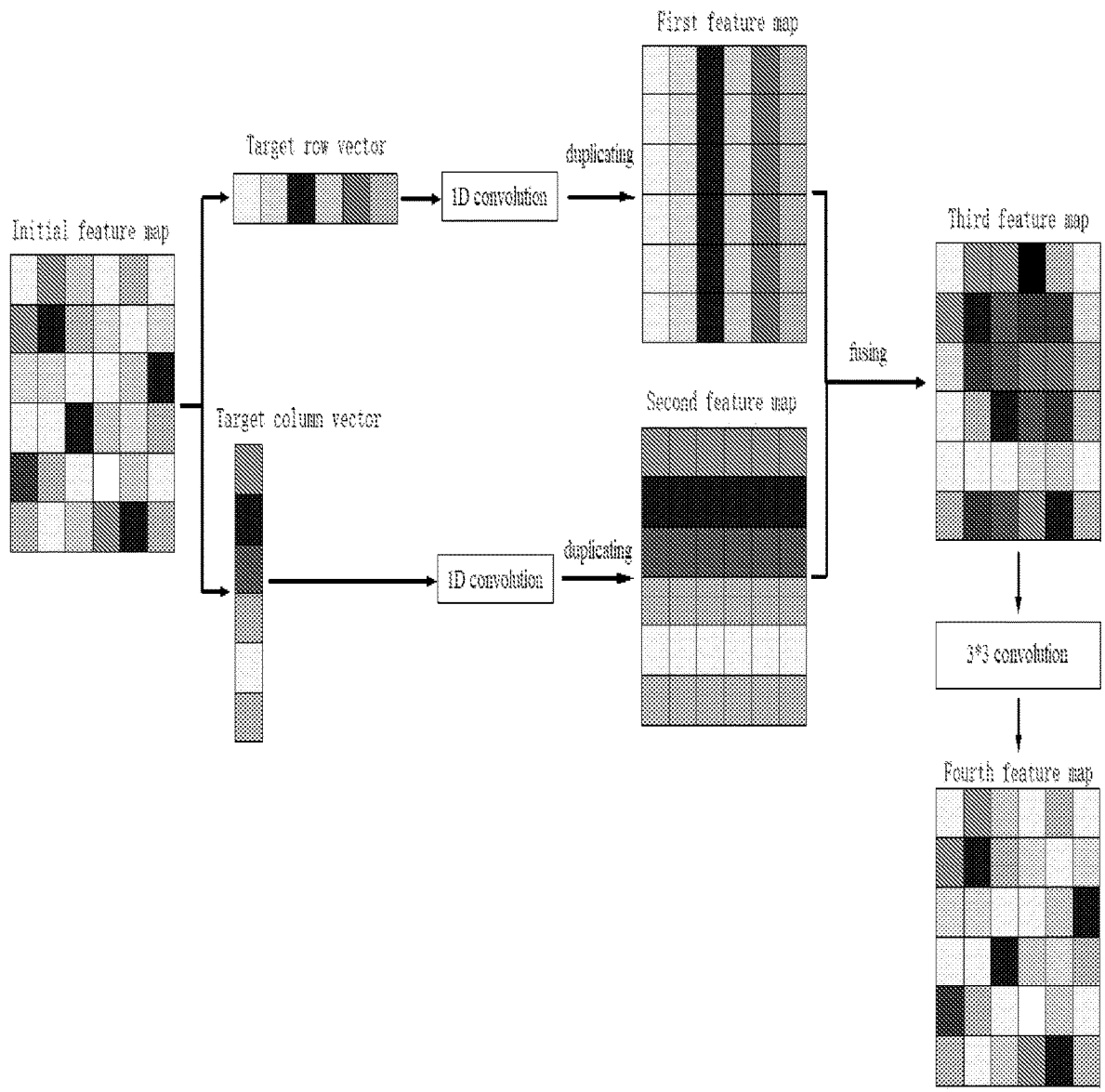
FIG. 2 is a schematic diagram of the cross-pooling processing to the feature map provided by embodiments of the present application.

The above-mentioned steps 103-108 can be summarized as an operation of cross-pooling, the corresponding processing schematic diagram thereof is shown in FIG. 2. In FIG. 2, first, the average value of elements in each column of pixels in the initial feature map is extracted to construct the target row vector, and the average value of elements in each row of pixels in the initial feature map is extracted to construct the target column vector. Then, one-dimensional convolution processing is performed on the target row vector and the target column vector respectively, and the target row vector is duplicated in the column direction to get the first feature map, and the target column vector is duplicated in the row direction to get the second feature map. Then, the first feature map and the second feature map are superimposed to get the third feature map, and after the two-dimensional convolution processing, the fourth feature map is obtained.

For conventional image reconstruction networks, the size of the pooling kernel of a pooling layer is usually 2*2, and the output feature map is obtained by constantly sliding the pooling kernel on the entire original feature map. In this way, the features fused in the calculation are all features within a very narrow pixel range, so the long-distance dependencies of the image cannot be captured. To solve this problem, an embodiment of the present application uses a cross-pooling layer to replace the conventional pooling layer, and the size of the corresponding pooling kernel is the same as that of a row or a column of the feature map, so the pixel range of the fused feature in calculation is wider, and the long-distance dependencies of the image may be fully captured.

Step 109, generating a reconstructed image corresponding to the initial image in accordance with the fourth feature map.

Finally, the reconstructed image corresponding to the original image can be obtained after performing an augmentation process commonly used in image reconstruction, such as deconvolution and up-sampling, on the fourth feature image.

In an embodiment of the present application, firstly, extracting an initial feature map of an original image, then respectively calculating an average value of element values for each column of pixels in the initial feature map, and constructing a target row vector in accordance with the average value, and duplicating the target row vector after a one-dimensional convolution processing in direction of column, to obtain a feature map; and, respectively calculating an average value of element values for each row of pixels in the initial feature map, and constructing a target column vector in accordance with the average value, and duplicating the target column vector after a one-dimensional convolution processing in direction of row, to obtain another feature map, then the two feature maps are fused. Finally, a reconstructed image is generated based on the fused feature map after a two-dimensional convolution processing. The above procedures use an approach of cross-pooling, which is equivalent to deploying a long bar-shaped (a row or column of the feature map) pooling kernel along one spatial dimension, this allows a wider range of pixels to be used in feature calculation, and therefore, it can capture the long-distance dependencies in images.

Figure 3:
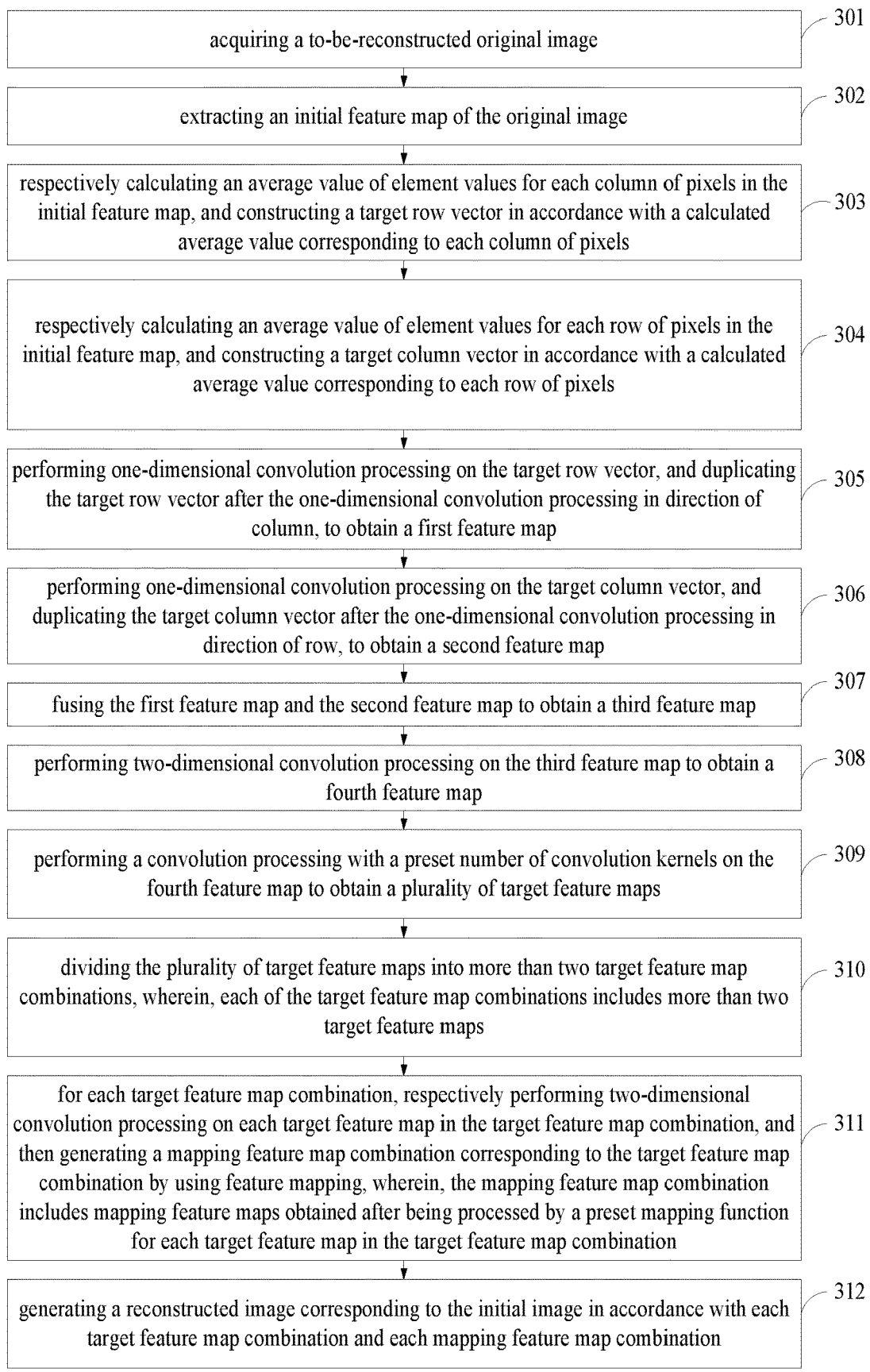
FIG. 3 is a flow chart of an another embodiment of the method for image reconstruction provided by embodiments of the present application.

Please refer to FIG. 3, which illustrates another method for image reconstruction provided by the embodiments of the present application, comprising:

step 301, acquiring a to-be-reconstructed original image;

Step 302, extracting an initial feature map of the original image;

Step 303, respectively calculating an average value of element values for each column of pixels in the initial feature map, and constructing a target row vector in accordance with a calculated average value corresponding to each column of pixels;

Step 304, respectively calculating an average value of element values for each row of pixels in the initial feature map, and constructing a target column vector in accordance with a calculated average value corresponding to each row of pixels;

Step 305, performing one-dimensional convolution processing on the target row vector, and duplicating the target row vector after the one-dimensional convolution processing in direction of column, to obtain a first feature map;

Step 306, performing one-dimensional convolution processing on the target column vector, and duplicating the target column vector after the one-dimensional convolution processing in direction of row, to obtain a second feature map;

Step 307, fusing the first feature map and the second feature map to obtain a third feature map;

Step 308, performing two-dimensional convolution processing on the third feature map to obtain a fourth feature map.

The steps 301-308 are the same as the steps 101-108, for details, refer to the description of the steps 101-108.

Step 309, performing a convolution processing with a preset number of convolution kernels on the fourth feature map to obtain a plurality of target feature maps;

In deep learning, the richness of feature maps is very important. In order to improve the performance of deep neural networks and the effect of image reconstruction, it is often necessary to obtain more feature maps. Therefore, after obtaining the fourth feature map, the number of obtained feature maps can be increased as shown in the steps 309 to 311. By setting convolution layers with a certain number of convolution kernels to process the fourth feature map, several different target feature maps can be obtained.

Step 310, dividing the plurality of target feature maps into more than two target feature map combinations, wherein, each of the target feature map combinations includes more than two target feature maps;

after obtaining a plurality of target feature maps, dividing the plurality of target feature maps to obtain more than two target feature map combinations, wherein, each of the target feature map combinations includes more than two target feature maps. It should be noted that, the number of target feature maps contained in different target feature map combinations can be the same or different. The way of dividing the target feature maps can be random dividing or in a specific order, which is not limited in the present application.

Step 311, for each target feature map combination, respectively performing two-dimensional convolution processing on each target feature map in the target feature map combination, and then generating a mapping feature map combination corresponding to the target feature map combination by using feature mapping, wherein, the mapping feature map combination includes mapping feature maps obtained after being processed by a preset mapping function for each target feature map in the target feature map combination;

after dividing the target feature maps, two-dimensional convolution processing is performed on all target feature maps in each target feature map combination, for example, the convolution with a convolution kernel at size of 3*3 can be used to perform the convolution processing, and then the mapping feature map combination corresponding to each target feature map combination can be generated by feature mapping. Specifically, each mapping feature map contained in a mapping feature map combination is obtained by each target feature map contained in the corresponding target feature map combination after processing by the mapping function respectively. For example, a target feature map combination A contains a total of three target feature maps: target feature map 1, target feature map 2 and target feature map 3, then a preset mapping function f(x) is used to process target feature map 1 and mapping feature map 1 is obtained; the f(x) is used to process the target feature map 2 to obtain the mapping feature map 2; the f(x) is used to process target feature map 3 to obtain mapping feature map 3. Then, the mapping feature map combination corresponding to the target feature map combination A final obtained consists of the mapping feature map 1, the mapping feature map 2 and the mapping feature map 3.

Furthermore, the step of generating a mapping feature map combination corresponding to the target feature map combination by using feature mapping may comprise:

using a preset linear function as the mapping function, and performing the feature mapping on each target feature map in the target feature map combination to obtain the mapping feature maps respectively corresponding to each target feature map in the target feature map combination.

In order to reduce the amount of calculation in the feature mapping process, a linear function can be used as the mapping function. For example, the linear function $f(x)$ a*x+b can be used as the mapping function, wherein x is an input target feature map, a and b are manually preset matrices of the same size as x. In the calculation, a and x are multiplied by the corresponding positions of matrix, and then the elements in the matrix b are added to obtain the output mapping feature map $f(x)$.

Step 312, generating a reconstructed image corresponding to the initial image in accordance with each target feature map combination and each mapping feature map combination.

By adopting the way of feature mapping, a larger number of feature maps can be generated, that is, each of the mapping feature map combinations mentioned above. Then, the reconstructed image corresponding to the original image can be generated according to the original target feature map combinations and the generated mapping feature map combinations.

In an embodiment of the present application, the step of generating a reconstructed image corresponding to the initial image in accordance with each target feature map combination and each mapping feature map may comprise:

arranging each target feature map combination and each mapped feature map combination in a specified order to obtain a final feature map combination;

generating a reconstructed image corresponding to the initial image in accordance with the final feature map combination.

When arranging the feature map combinations, the order of each target feature map combination and each mapping feature map combination is not restricted, but the order of each feature map contained in each feature map combination remains unchanged in the feature map combination. By sorting, a final feature map combination containing a large number of feature maps can be obtained, an then the reconstructed image corresponding to the original image can be generated based on the final feature map combination.

Furthermore, the step of arranging each target feature map combination and each mapped feature map combination in a specified order to obtain a final feature map combination may comprise:

arranging each target feature map combination at two ends of the final feature map combination, and arranging each mapped feature map combination between the two ends of the final feature map combination.

When arranging the feature map combination, each target feature map combination can be arranged at two ends, and each mapping feature map combination can be arranged in the middle. For example, if there are two target feature map combinations, one of the target feature map combinations can be duplicated as the first end of the final feature map combination, and the other target feature map combination can be duplicated as the tail end of the final feature map combination, and the two mapping feature map combinations obtained by the feature mapping of the two target feature map combinations are arranged between the first and last ends of the final feature map combination.

Furthermore, the step of generating a reconstructed image corresponding to the initial image in accordance with the final feature map combination may comprise:

performing a deconvolution processing on feature maps in the final feature map combination, and then fusing the feature maps after the deconvolution processing to obtain a reconstructed image corresponding to the initial image.

When generating the reconstructed image, the feature map in the final feature map combination can be input into the deconvolution layer for processing, and the dimension of the feature map can be upgraded to make the dimensionality of the processed result consistent with that of the reconstructed image, meanwhile, all feature maps can be fused by setting the number of input channels to the number of channels of the reconstructed image, so as to obtain the final reconstructed image.

Figure 4:
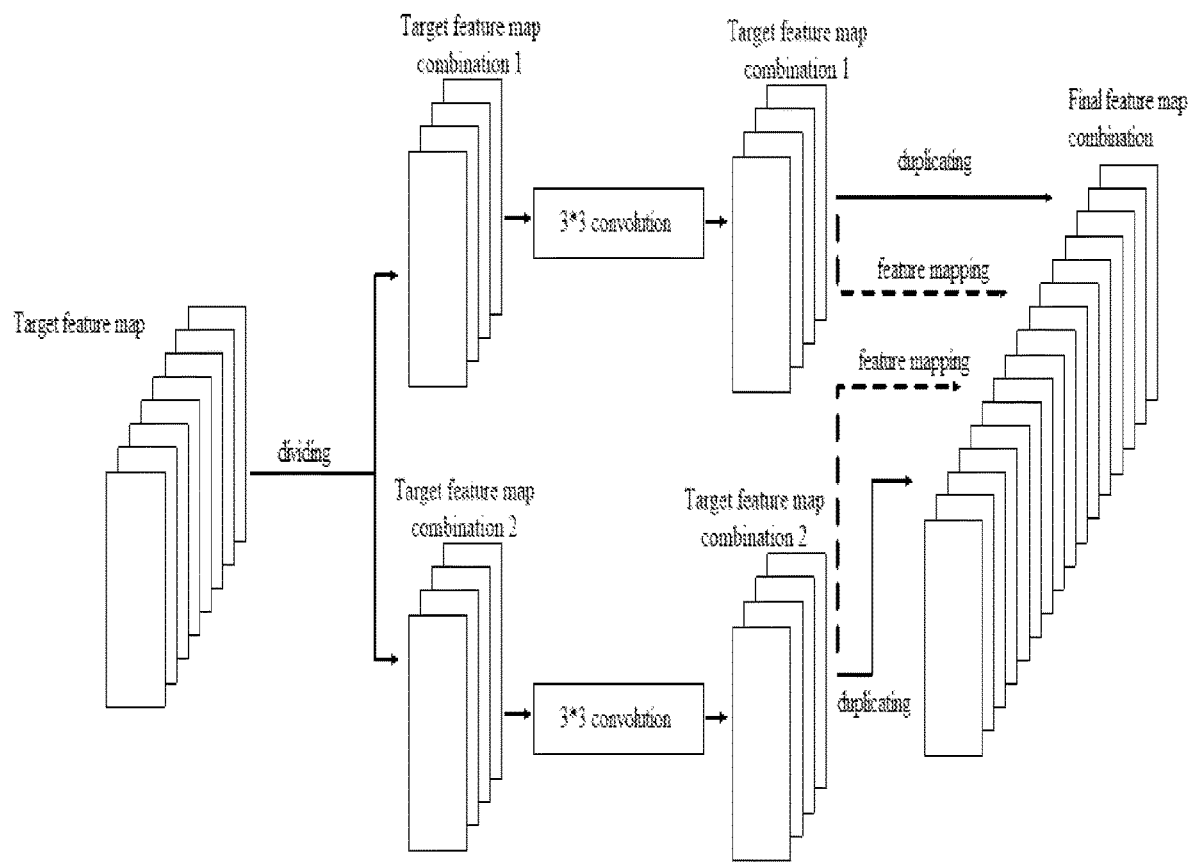
FIG. 4 is a schematic diagram of the feature mapping processing to the feature map provided by embodiments of the present application.

The steps 310-312 belong to the feature mapping processing of the feature maps. The corresponding processing schematic diagram is shown as FIG. 4. In FIG. 4, a plurality of target feature maps are divided into two target feature map combinations, after a convolution processing with a convolution kernel at size of 3*3, one of the target feature map combinations can be duplicated as the first end of the final feature map combination, and the other target feature map combination can be duplicated as the tail end of the final feature map combination; in addition, the feature mapping is performed on the two target feature map combinations respectively, and the two mapping feature map combinations obtained are inserted between the first and tail ends of the final feature map combination. Finally, the reconstruction of image can be completed based on the final feature map combination. Comparing with the way of initializing more convolution kernels and performing convolution calculation to obtain more feature maps, the embodiment of the present application generates more feature maps by performing feature mapping on the original feature maps, which may avoid complex convolution calculation, effectively reducing the computation amount, and improving the speed of algorithm processing.

After obtaining the feature map of the original image by the way of cross-pooling, the embodiment of the present application generates more feature maps by the way of feature mapping, so as to obtain more feature maps under the premise of lower calculation amount, which can improve the performance of the deep neural networks used for image reconstruction.

It should be understood that the sequence number of the steps in each of the above embodiments does not imply the order of execution, and that the order of execution of each process shall be determined by its function and internal logic, and shall not constitute any limitation on the implementation process of the embodiments of the present application.

A method for image reconstruction is described above, and an apparatus for image reconstruction is described below.

Figure 5:
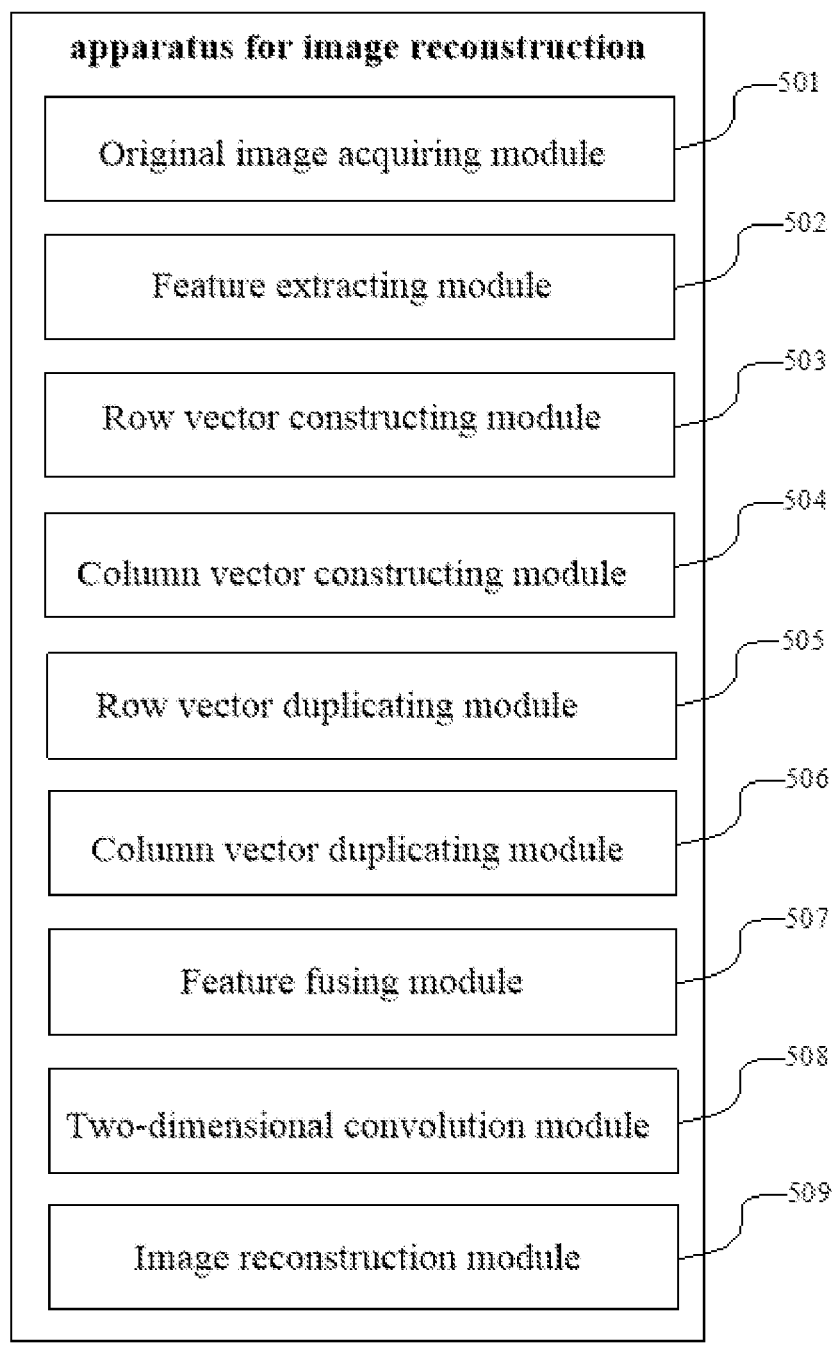
FIG. 5 is a structural diagram of an embodiment of an apparatus for image reconstruction provided by embodiments of the present application.

Referring to FIG. 5, an apparatus for image reconstruction in an embodiment of the present application comprises:
- an original image acquiring module 501, configured to acquire a to-be-reconstructed original image;
- a feature extracting module 502, configured to extract an initial feature map of the original image;
- a row vector constructing module 503, configured to respectively calculate an average value of element values for each column of pixels in the initial feature map, and construct a target row vector in accordance with a calculated average value corresponding to each column of pixels;
- a column vector constructing module 504, configured to respectively calculate an average value of element values for each row of pixels in the initial feature map, and construct a target column vector in accordance with a calculated average value corresponding to each row of pixels;
- a row vector duplicating module 505, configured to perform one-dimensional convolution processing on the target row vector, and duplicate the target row vector after the one-dimensional convolution processing in direction of column to obtain a first feature map;
- a column vector duplicating module 506, configured to perform one-dimensional convolution processing on the target column vector, and duplicate the target column vector after the one-dimensional convolution processing in direction of row to obtain a second feature map;
- a feature fusing module 507, configured to fuse the first feature map and the second feature map to obtain a third feature map;
- a two-dimensional convolution module 508, configured to perform two-dimensional convolution processing on the third feature map to obtain a fourth feature map;
- an image reconstruction module 509, configured to generate a reconstructed image corresponding to the initial image in accordance with the fourth feature map.

In an embodiment of the present application, the image reconstruction module may comprise:
- a convolution processing unit, configured to perform a convolution processing with a preset number of convolution kernels on the fourth feature map to obtain a plurality of target feature maps;
- a feature map dividing unit, configured to divide the plurality of target feature maps into more than two target feature map combinations, wherein, each of the target feature map combinations includes more than two target feature maps;
- a feature mapping unit, configured to for each target feature map combination, respectively performing two-dimensional convolution processing on each target feature map in the target feature map combination, and then generating a mapping feature map combination corresponding to the target feature map combination by using feature mapping, wherein, the mapping feature map combination includes mapping feature maps obtained after being processed by a preset mapping function for each target feature map in the target feature map combination;
- an image reconstruction unit, configured to generate a reconstructed image corresponding to the initial image in accordance with each target feature map combination and each mapping feature map combination.

Furthermore, the image reconstruction unit can comprise:
- a feature map combination arranging sub-unit, configured to arrange each target feature map combination and each mapped feature map combination in a specified order to obtain a final feature map combination;
- an image reconstruction sub-unit, configured to generate a reconstructed image corresponding to the initial image in accordance with the final feature map combination.

Furthermore, the feature map combination arranging sub-unit can be used for arranging each target feature map combination at two ends of the final feature map combination, and arranging each mapped feature map combination between the two ends of the final feature map combination.

Furthermore, the image reconstruction sub-unit can be configured to perform a deconvolution processing on feature maps in the final feature map combination, and then fuse the feature maps after the deconvolution processing to obtain a reconstructed image corresponding to the initial image.

Furthermore, the feature mapping unit can be configured to use a preset linear function as the mapping function, and perform the feature mapping on each target feature map in the target feature map combination to obtain the mapping feature maps respectively corresponding to each target feature map in the target feature map combination.

An embodiment of the present application further provides a non-transitory computer readable storage medium, configured to store a computer program, the computer program, when executed by a processor, implements any one of the methods for image reconstruction shown in FIG. 1 or FIG. 3.

An embodiment of the present application further provides a computer readable storage medium, configured to store a computer program, the computer program, when executed by a processor, implements any one of the methods for image reconstruction shown in FIG. 1 or FIG. 3.

An embodiment of the present application further provides a computer program product, when operated on a terminal device, executes any one of the methods for image reconstruction shown in FIG. 1. or FIG. 3.

Figure 6:
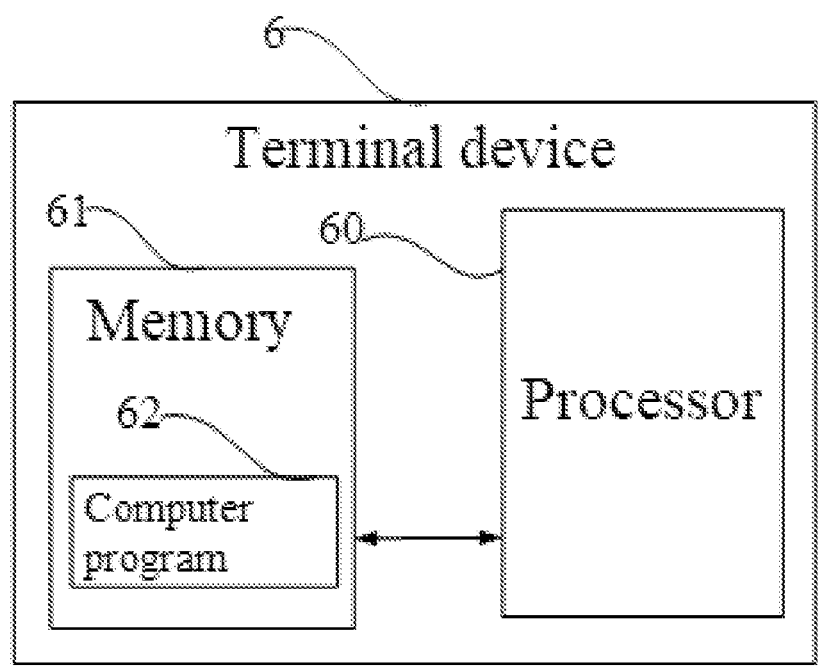
FIG. 6 is a schematic diagram of a terminal device for image reconstruction provided by embodiments of the present application.

FIG. 6 is a schematic diagram of a terminal device for image reconstruction provided by an embodiment of the present application. As shown in FIG. 6, the terminal device 6 of the embodiment comprises a processor 60, a memory 61, and a computer program 62 stored on the memory 61 and capable of running on the processor 60. The steps in embodiments of each of the above image reconstruction methods are realized when the processor 60 executes the computer program 62, such as steps 101 to 109 shown in FIG. 1. Alternatively, the processor 60 executes the computer program 62 to realize the functions of the modules/units in the above device embodiments, such as the functions of modules 501 to 509 shown in FIG. 5.

The computer program 62 may be segmented into one or more modules/units stored in the memory 61 and executed by the processor 60 to complete the present application. The one or more modules/units may be a series of computer program instruction segments capable of performing a specific function, the instruction segments are used to describe the execution process of the computer program 62 in the terminal device 6.

The processor 60 may be a Central Processing Unit (CPU), or any other general-purpose processor, a Digital Signal Processor (DSP), an Application Specific Integrated Circuit (ASIC), a Field-Programmable Gate Array (FPGA), or any other programmable logic device, a discrete gate or a transistor logic device, a discrete hardware component, etc. A general-purpose processor can be a microprocessor or any other conventional processor, etc.

The memory 61 may be an internal storage unit of the terminal device 6, such as a hard disk or a memory of the terminal device 6. The memory 61 may also be an external storage device of the terminal device 6, such as a plug-in hard disk, a Smart Media Card (SMC), a Secure Digital (SD) Card, a Flash Card, etc., equipped with the terminal device 6. Furthermore, the memory 61 may also comprise both an internal storage unit of the terminal device 6 and an external storage device. The memory 61 is used to store the computer program and other programs and data required by the terminal equipment. The memory 61 may also be used to temporarily store data that has been or will be output.

A skilled person in the field can clearly understand that in order to describe the convenience and simplicity, only the division of the above functional units and modules is illustrated by example. In practical application, the above functions can be assigned to different functional units and modules to complete according to needs, that is, the internal structure of the device is divided into different functional units or modules to complete all or part of the functions described above. Each functional unit and module in an embodiment can be integrated in a processing unit, or each unit can exist physically separately, or two or more units can be integrated in a unit, and the integrated unit can be realized in the form of hardware or software functional units. In addition, the specific names of each functional unit and module are only for the convenience of distinguishing between each other, and are not used to limit the scope of protection of this application. The specific working process of the units and modules in the above system can refer to the corresponding process in the above-mentioned embodiments of the method, and will not be repeated here.

A person skilled in the field can clearly understand that for the convenience and simplicity of description, the specific working process of the system, device and unit described above can refer to the corresponding process in the above-mentioned embodiments of the method, and will not be repeated here.

In the above embodiments, the description of each embodiment has its own emphasis, and the part that is not detailed or documented in an embodiment can be referred to the relevant description of other embodiments.

A person skilled in the prior art may realize that the units and algorithmic steps of the examples described in conjunction with the embodiments disclosed herein can be implemented in electronic hardware, or in a combination of computer software and electronic hardware. Whether these functions are performed in hardware or software depends on the specific application and design constraints. Technical professionals may use different methods for each particular application to achieve the described functionality, but such implementation should not be considered beyond the scope of this application.

In the embodiments provided in the present application, it should be understood that the devices and methods disclosed may be implemented by other means. For example, the system embodiments described above are only schematic, for example, the division of the module or unit is only a logical function division, and the actual implementation can be divided in other ways, such as multiple units or components can be combined or integrated into another system, or some features can be ignored or not executed. In addition, the coupling or direct coupling or communication connection between each other shown or discussed may be an indirect coupling or communication connection through some interface, device or unit, which may be electrical, mechanical or other form.

The units described as separate components may or may not be physically separate, and the components displayed as units may or may not be physical units, that is, may be located in one place, or may be distributed across multiple network units. Some or all of the units can be selected according to the actual needs to realize the purpose of the embodiment scheme.

In addition, the functional units in various embodiments of this application may be integrated in a single processing unit, or the units may exist separately physically, or two or more units may be integrated in a single unit. The integrated unit can be realized either in the form of hardware or in the form of software functional unit.

The integrated unit, when implemented in the form of a software functional unit and marketed or used as an independent product, can be stored in a non-transitory computer readable storage medium. Based on this understanding, the present application implements all or part of the processes in the embodiments mentioned above, which may also be accomplished by instructs related hardware through a computer program that may be stored in a non-transitory computer readable storage medium, and the computer program, when executed by a processor, may implement the steps of the embodiments of the above methods. Wherein, the computer program includes the computer program code, the computer program code can be source code form, object code form, executable files or some intermediate form. The computer readable medium may comprise: any entity or device capable of carrying the computer program code, a recording medium, a USB disk, a portable hard drive, a magnetic disk, an optical disk, a computer memory, Read Only Memory (ROM), Random Access Memory (RAM), an electric carrier signal, a telecommunication signal and a software distribution medium, etc. It should be noted that the contents contained in the computer readable media may be appropriately increased or decreased according to the requirements of the legislation and patent practice in the jurisdiction, for example, in some jurisdictions, according to the legislation and patent practice, the computer readable media does not include the carrier signal and telecommunications signal.

The above embodiments are used only to illustrate the technical solution of the present application and not to restrict it. Notwithstanding the detailed description of the present application by reference to the foregoing embodiments, it should be understood by those skilled in the art that they may modify the technical scheme recorded in the foregoing embodiments or make equivalent substitutions for some of the technical features, such modification or replacement shall not separate the essence of the corresponding technical scheme from the spirit and scope of the technical scheme of each embodiment of this application, and shall be included in the scope of protection of this application.

What is claimed is:

1. A method for image reconstruction, comprising:
acquiring a to-be-reconstructed original image;
extracting an initial feature map of the original image;
respectively calculating an average value of element values for each column of pixels in the initial feature map, and constructing a target row vector in accordance with a calculated average value corresponding to each column of pixels;
respectively calculating an average value of element values for each row of pixels in the initial feature map, and constructing a target column vector in accordance with a calculated average value corresponding to each row of pixels;
performing one-dimensional convolution processing on the target row vector, and duplicating the target row vector after the one-dimensional convolution processing in direction of column, to obtain a first feature map;
performing one-dimensional convolution processing on the target column vector, and duplicating the target column vector after the one-dimensional convolution processing in direction of row, to obtain a second feature map;
fusing the first feature map and the second feature map to obtain a third feature map;
performing two-dimensional convolution processing on the third feature map to obtain a fourth feature map;
generating a reconstructed image corresponding to the initial image in accordance with the fourth feature map.

2. The method for image reconstruction according to claim 1, wherein, the step of generating a reconstructed image corresponding to the initial image in accordance with the fourth feature map comprises:
performing a convolution processing with a preset number of convolution kernels on the fourth feature map to obtain a plurality of target feature maps;
dividing the plurality of target feature maps into more than two target feature map combinations, wherein, each of the target feature map combinations includes more than two target feature maps;
for each target feature map combination, respectively performing two-dimensional convolution processing on each target feature map in the target feature map combination, and then generating a mapping feature map combination corresponding to the target feature map combination by using feature mapping, wherein, the mapping feature map combination includes mapping feature maps obtained after being processed by a preset mapping function for each target feature map in the target feature map combination;
generating a reconstructed image corresponding to the initial image in accordance with each target feature map combination and each mapping feature map combination.

3. The method for image reconstruction according to claim 2, wherein, the step of generating a reconstructed image corresponding to the initial image in accordance with each target feature map combination and each mapped feature map comprises:
arranging each target feature map combination and each mapped feature map combination in a specified order to obtain a final feature map combination;
generating a reconstructed image corresponding to the initial image in accordance with the final feature map combination.

4. The method for image reconstruction according to claim 3, wherein, the step of arranging each target feature map combination and each mapped feature map combination in a specified order to obtain a final feature map combination comprises:
arranging each target feature map combination at two ends of the final feature map combination, and arranging each mapped feature map combination between the two ends of the final feature map combination.

5. The method for image reconstruction according to claim 3, wherein, the step of generating a reconstructed image corresponding to the initial image in accordance with the final feature map combination comprises:
performing a deconvolution processing on feature maps in the final feature map combination, and then fusing the feature maps after the deconvolution processing to obtain a reconstructed image corresponding to the initial image.

6. The method for image reconstruction according to claim 2, wherein, the step of generating a mapping feature map combination corresponding to the target feature map combination by using feature mapping comprises:
using a preset linear function as the mapping function, and performing the feature mapping on each target feature map in the target feature map combination to obtain the mapping feature maps respectively corresponding to each target feature map in the target feature map combination.

7. The method for image reconstruction according to claim 1, wherein, the step of fusing the first feature map and the second feature map to obtain a third feature map comprises:
summing elements at corresponding positions of the first feature map and the second feature map to obtain the third feature map.

8. A terminal device, comprising a memory, a processor, and a computer program stored on the memory and configured to be executed by the processor, wherein, the computer program, when executed by the processor, implements the method for image reconstruction according to claim 1.

9. A non-transitory computer readable storage medium, configured to store a computer program, wherein, the computer program, when executed by a processor, implements the method for image reconstruction according to claim 1.

\* \* \* \* \*